US 8,578,693 B2
Nov. 12, 2013

(12) United States Patent
Marissen

(10) Patent No.: US 8,578,693 B2
(45) Date of Patent: Nov. 12, 2013

(54) POLYOLEFIN FIBER

(75) Inventor: Roelof R. Marissen, Born (NL)

(73) Assignee: DSM IP Assets B.V., Heerlen (NL)

( * ) Notice: Subject to any disclaimer, the term of this patent is extended or adjusted under 35 U.S.C. 154(b) by 320 days.

(21) Appl. No.: 13/122,026

(22) PCT Filed: Oct. 5, 2009

(86) PCT No.: PCT/EP2009/062895
§ 371 (c)(1),
(2), (4) Date: Mar. 31, 2011

(87) PCT Pub. No.: WO2010/040711
PCT Pub. Date: Apr. 15, 2010

(65) Prior Publication Data
US 2011/0173874 A1    Jul. 21, 2011

(30) Foreign Application Priority Data

| Oct. 7, 2008 | (EP) | 08017539 |
| Oct. 29, 2008 | (EP) | 08018871 |
| Nov. 20, 2008 | (EP) | 08020227 |
| Dec. 17, 2008 | (EP) | 08021891 |

(51) Int. Cl.
*D02G 3/06* (2006.01)
(52) U.S. Cl.
USPC ............ 57/31; 57/260; 57/282; 57/310
(58) Field of Classification Search
USPC ............ 57/31, 260, 282, 310
See application file for complete search history.

(56) References Cited

U.S. PATENT DOCUMENTS

| 3,601,971 A | 8/1971 | Waterhouse |
| 3,681,912 A * | 8/1972 | Silverman ............... 57/284 |
| 4,568,415 A | 2/1986 | Woltron |
| 5,106,555 A | 4/1992 | Kobayashi et al. |
| 5,749,214 A * | 5/1998 | Cook ............... 57/310 |
| 6,148,597 A | 11/2000 | Cook |
| 2008/0044598 A1* | 2/2008 | Stroppiana ............... 428/17 |
| 2009/0012251 A1 | 1/2009 | Dirks et al. |
| 2010/0152391 A1* | 6/2010 | Paridon et al. ............... 525/240 |

FOREIGN PATENT DOCUMENTS

| EP | 1 647 616 | 4/2006 |
| GB | 1 063 509 | 3/1967 |
| JP | 42-21301 | 10/1942 |
| JP | 07-304106 | 11/1995 |

OTHER PUBLICATIONS

Machine Translation of JP 07-304106, patent date Nov. 21, 1995.*
International Search Report for PCT/EP2009/062895, mailed Apr. 1, 2010.

* cited by examiner

*Primary Examiner* — Shaun R Hurley
(74) *Attorney, Agent, or Firm* — Nixon & Vanderhye P.C.

(57) ABSTRACT

The invention relates to a process for making a polyolefin fiber. The process comprises the steps of providing at least one polyolefin tape; twisting or folding the at least one polyolefin tape longitudinally to obtain a precursor fiber and exposing the precursor fiber under tension to a temperature within the melting point range of the polyolefin for a time sufficient to at least partly two or more parts of the precursor fiber. The invention also relates to the fiber obtainable thereby.

26 Claims, No Drawings

POLYOLEFIN FIBER

This application is the U.S. national phase of International Application No. PCT/EP2009/062895 filed 5 Oct. 2009, which designated the U.S. and claims priority to EP Application No. 08017539.1 filed 7 Oct. 2008; EP Application No. 08018871.7 filed 29 Oct. 2008; EP Application No. 08020227.8 filed 20 Nov. 2008; and EP Application No. 08021891.0 filed 17 Dec. 2008, the entire contents of each of which are hereby incorporated by reference.

TECHNICAL FIELD OF THE INVENTION

The invention relates to a process for making a polyolefin fiber and the polyolefin fiber obtainable thereby. The invention also relates to the application of the polyolefin fiber.

BACKGROUND OF THE INVENTION

Polyolefin fibers are typically made by spinning a fluid composition comprising polyolefin from an extrusion die. Polyolefin fibers made in this way may be made into a multifilament yarn by e.g. twisting a plurality of fibers. Polyolefin fibers may also be used as a precursor for making further products, including a monofilament-like fiber. One way of doing this is to fuse a plurality of precursor polyolefin fibers into one final product. In EP 0740002 B1, a process for making a fishing line from yarns of filamentous materials is described, wherein a braided, twisted, or twisted and plied fishing line made from yarns of gel spun polyolefin filaments, is exposed to a temperature within the melting point range of said polyolefin for a time sufficient to at least partially fuse adjacent filaments while stretching said line at a stretching ratio within the range from 1.01 to 2.5. The yarns applied in this process are continuous multi-filament yarns, more specifically such yarns made by so-called gel spinning of ultrahigh molar mass polyethylene (UHMwPE), for example yarns commercially available under the names Spectra® or Dyneema®.

In the known processes, the yarn or the fiber is made from multiple fibers. Possible differences in the properties between the precursor fibers may affect the properties of the final product. Moreover, the parts of the final product which are originally the interfaces between the precursor fibers may have different properties from the other parts of the product.

OBJECT OF THE INVENTION

It is an object of the present invention to provide a novel process for making a polyolefin fiber, in which the above limitations and/or other limitations are reduced.

DISCLOSURE OF THE INVENTION

Therefore, a process is provided for making a polyolefin fiber, comprising the steps of providing at least one polyolefin tape; twisting or folding the at least one polyolefin tape longitudinally to obtain a precursor fiber and exposing the precursor fiber under tension to a temperature within the melting point range of the polyolefin for a time sufficient to at least partly fuse two or more parts of the precursor fiber.

The inventors have now realized that the shape of the cross section of a polyolefin tape allows twisting or folding of the tape in its longitudinal direction, and the material of the polyolefin tape allows fusing of the adjacent layers. Since the fiber is made from a tape or tapes that are inherently connective in the width direction, the fiber made by the process according to the present invention has a more homogeneous structure and better integrity in its transverse direction compared to a fiber made from a plurality of filaments having a circular cross section. The number of the tape required for making a fiber can be made smaller than when using precursor filaments having a generally circular cross section. Furthermore, the surface of the product may be made to have much less area of fused borders compared to a product made from multiple precursor filaments. The fused borders decrease the surface smoothness of the fiber. By adjusting the way in which the tape is twisted or folded and the fusing conditions such as temperature and pressure, the area of the fused borders on the surface, thus the surface roughness, of the fiber may be adjusted. It is advantageous, especially for use in a fishing line, that the surface roughness is low. Moreover, during the reshaping of the tape into a fiber, the properties may even be improved.

Another important advantage of the present invention is that the polyolefin tape from which the fiber is made may not necessarily be made by a spinning process such as a gel-spinning process or a melt-spinning process. For example, a polyolefin tape may be made from powder polymers by applying sufficient pressure and temperature. Making of a polyolefin tape from powder polymers is known e.g. from U.S. Pat. Nos. 4,879,076 and 5,091,133, which are incorporated herein by reference. Therefore, according to the present invention, it has been made possible to make a fiber without a spinning process.

Preferably, the fiber is made from one tape. The advantages of the present invention are even more pronounced in this embodiment. The shape of the cross section of a polyolefin tape allows reshaping one single polyolefin tape into a fiber having e.g. a circular cross section. Such reshaping is not possible with a conventional fiber with a generally circular cross section. The structure of the resultant fiber is most homogeneous when it is made from one single tape.

A tape is herein understood to mean any flat body, and includes a body the length dimension of which is much greater than its cross section dimension, as well as a body which does not necessarily have a larger length dimension compared to the longer axis of the cross section. The term 'tape' includes a body which can be referred as a ribbon, a band, a film or a sheet. The cross section may have various anisotropic shapes, such as rectangular or elliptical. The longer axis of the cross section is referred as width and the shorter axis of the cross section, perpendicular to the width direction, is referred as thickness.

A precursor fiber is herein understood to mean a body made by reshaping the tape or tapes, to be transformed into one substantially integral body by fusing.

As used herein, longitudinally twisting or folding a tape means bending or otherwise reshaping the tape to make one lateral edge contact another part of the tape so that the width of at least one part of the tape becomes smaller, to obtain a precursor fiber. When more than one tape are longitudinally twisted or folded, it is herein meant that the bundle of more than one tape is twisted or folded as a whole. The bundle is reshaped to make one lateral edge of the bundle contact another part of the bundle so that the width of the at least one part of the bundle becomes smaller, to obtain a precursor fiber.

The tape can be twisted or folded any number of times to obtain the desired result. For example, the tape can be twisted between 2 and 1500 turns per meter (t/m). In particular, the tape is twisted from 50 to 1000 t/m, more preferably 100 to 700 t/m.

A fiber is herein understood to mean an elongated body the length dimension of which is much greater than its cross section dimension. The cross section may be of any shape, e.g. circular, elliptical, rectangular, square, U-shaped.

Polyolefin may be polyethylene, polypropylene, or any other suitable polymer which can be fused together without substantial decrease in its mechanical properties.

For the step in which adjacent layers are at least partly fused, it is possible to use fusion aids such as paraffin oil depending on the degree of fusion required for each application.

In a preferred embodiment, the polyolefin tape is a HMwPE or UHMwPE tape. By a HMwPE or UHMwPE tape is meant a tape which comprises HMwPE or UHMwPE at 75 wt % of the total weight of the tape. The ratio is preferably at least 90 wt %, and most preferably at 100 wt %. When the tape is made from a combination of HMwPE and UHMwPE, the resultant tape may be a HMwPE tape or a UHMwPE tape, depending on the ratio of the HMwPE and the UHMwPE. Similarly, a fiber which comprises HMwPE or UHMwPE at 75 wt % of the total weight of the fiber is referred as a HMwPE or UHMwPE fiber.

By high molecular weight polyethylene (HMwPE), it is herein meant a polyethylene with a molecular weight from 50,000 to 400,000. Ultrahigh molecular weight polyethylene (UHMwPE) is defined herein as a polyethylene with a molecular weight of at least 400,000. UHMwPE may have a molecular weight of up to several millions. Unless otherwise stated, the molecular weight referred herein is a weight average molecular weight (Mw).

Intrinsic viscosity may be used for determining the molecular weight. Intrinsic viscosity is a measure for molar mass (also called molecular weight) that can more easily be determined than actual molar mass parameters such as Mn and Mw. The IV is determined according to method PTC-179 (Hercules Inc. Rev. Apr. 29, 1982) at 135° C. in decalin, the dissolution time being 16 hours, with DBPC as the anti-oxidant in an amount of 2 g/l solution, and the viscosity at different concentrations is extrapolated to zero concentration. There are several empirical relations between IV and Mw, but such relation is highly dependent on molar mass distribution. Based on the equation $Mw=5.37*10^4[IV]^{1.37}$ (see EP 0504954 A1) an IV of 4.5 dl/g would be equivalent to a Mw of about $4.2 \times 10^5$ g/mol.

Because of their long molecule chains, stretched UHMwPE fibers with an IV of more than 5 dl/g have very good mechanical properties, such as a high tensile strength, modulus, and energy absorption at break. More preferably, a polyethylene with an IV of more than 10 dl/g is chosen. This is because a yarn made by gel-spinning such UHMwPE yarn offers a combination of high strength, low relative density, good hydrolysis resistance, and excellent wear properties. Suitable UHMwPE has an intrinsic viscosity of typically above 5 dl/g, preferably between about 8 and 40 dl/g, more preferably between 10 and 30, or 12 and 28, or between 15 and 25 dl/g.

Preferably, the HMwPE and UHMwPE of the present invention are a linear polyethylene, i.e. a polyethylene with less than one side chain or branch per 100 carbon atoms, and preferably less than one side chain per 300 carbon atoms, a branch generally containing at least 10 carbon atoms. Preferably, only polyethylene is present, but alternatively the polyethylene may further contain up to 5 mol % of alkenes that may or may not be copolymerized with it, such as propylene, butene, pentene, 4-methylpentene or octene. The polyethylene may further contain additives that are customary for such fibres, such as anti-oxidants, thermal stabilizers, colorants, etc., up to 15 weight %, preferably 1-10 weight %.

In one embodiment, the tape is a monofilament tape. A monofilament is herein understood to mean a filament obtainable from a single spin hole by spinning. It will be appreciated that the monofilament used herein does not need to have a circular cross section. This embodiment is advantageous in that such a monofilament tape has a highly homogeneous structure.

According to one embodiment, the tape is provided by providing a fluid composition comprising HMwPE and/or UHMwPE; spinning a fluid tape from the fluid composition from one spinhole having an anisotropic shape; cooling the fluid tape to obtain a solidified tape and drawing the solidified tape in at least one direction in at least one drawing step. An isotropic shape may be various shapes, e.g. rectangular or elliptical.

During this step of providing the tape, the solidified tape may be already folded in the longitudinal direction. In one embodiment, after the step of obtaining the solidified tape, the solidified tape is wound by a winder which has a slot with a width smaller than the width of solidified tape. This results in the solidified tape being folded in the longitudinal direction. The adjacent layers of the folded solidified tape may be at least partly fused during the drawing step. The tape thus obtained, which comprises longitudinally folded and possibly fused layers, may be subjected to the subsequent step of twisting or folding.

Preferably, the drawing step is performed only in longitudinal direction. Such a drawing step gives the tape a high tenacity. Preferably, the draw ratio is at least 1.5, more preferably at least 5, more preferably at least 10. An especially high tenacity is obtained with such a draw ratio.

According to a further embodiment, the tape is provided by performing the drawing in at least two directions. The drawing may be done bidirectionally, i.e. in the machine direction as well as in the substantially traverse direction, or even in more directions. Preferably, the drawing is made at an area draw ratio, i.e. the stretch factor in terms of area, of at least 10. The tape made according to this process may have a large width which gives more freedom in the manner in which the tape is twisted or folded in the subsequent step.

According to a preferred embodiment, the tape is a gel-spun UHMwPE tape. Gel spinning of UHMwPE has been described in various publications, including EP 0205960 A, EP 0213208A1, U.S. Pat. No. 4,413,110, WO 01/73173 A1, and Advanced Fiber Spinning Technology, Ed. T. Nakajima, Woodhead Publ. Ltd (1994), ISBN 1-855-73182-7, and references cited therein. These publications are incorporated herein by reference. Therefore, according to one aspect of the present invention, the fluid composition is a solution of UHMwPE in a solvent and the process comprises the step of at least partly removing the solvent.

In the process, any of the known solvents for gel spinning of UHMwPE can be used. Suitable examples of spinning solvents include aliphatic and alicyclic hydrocarbons, e.g. octane, nonane, decane and paraffins, including isomers thereof; petroleum fractions; mineral oil; kerosene; aromatic hydrocarbons, e.g. toluene, xylene, and naphthalene, including hydrogenated derivatives thereof, e.g. decalin and tetralin; halogenated hydrocarbons, e.g. monochlorobenzene; and cycloalkanes or cycloalkenes, e.g. careen, fluorine, camphene, menthane, dipentene, naphthalene, acenaphtalene, methylcyclopentandien, tricyclodecane, 1,2,4,5-tetramethyl-1,4-cyclohexadiene, fluorenone, naphtindane, tetramethyl-p-benzodiquinone, ethylfuorene, fluoranthene and naphthenone. Also combinations of the above-enumerated spinning solvents may be used for gel spinning of UHMWPE, the combination of solvents being also referred to for simplicity as spinning solvent. In one embodiment, the spinning solvent of choice has a low vapor pressure at room temperature, e.g. paraffin oil. It was also found that the process of the invention is especially advantageous for relatively volatile spinning solvents at room temperature, as for example decalin, tetralin and kerosene grades. Most preferably, the spinning solvent is decalin.

A gel-spun longitudinally drawn UHMwPE tape has a very high tenacity. Preferably, the UHMwPE tape has a tenacity of at least 20 cN/dtex, preferably at least 25 cN/dtex, even more preferably at least 30 cN/dtex, most preferably at least 35 cN/dtex. Such a high tenacity is obtainable due to the fact that the tape is a drawn UHMwPE tape.

Furthermore, the gel-spun longitudinally drawn UHMwPE tape has a very high modulus. Preferably, the tape has a modulus of at least 600 cN/dtex, more preferably at least 900 cN/dtex, even more preferably at least 1300 cN/dtex.

According to a further embodiment, the tape is a melt-spun HMwPE tape or a melt-spun UHMwPE tape wherein the UHMwPE has a molecular weight of up to 800,000. The melt-spinning process is widely known in the art, and involves heating a PE composition to form a PE melt, extruding the PE melt, cooling the extruded melt to obtain a solidified PE, and drawing the solidified PE at least once. The process is mentioned e.g. in EP0344860A1, WO03/037590A1, EP1445356 and EP1743659A1, which are incorporated herein by reference. Therefore, according to one aspect of the present invention, the fluid composition is a melt of HMwPE and/or UHMwPE having a molecular weight of up to 800,000.

In this embodiment, PE is chosen in view of the processibility. HMwPE can be melt-spun without difficulty, and UHMwPE with a molecular weight of up to 800,000 can also be melt-spun. A higher molecular weight provides a tape with more desirable mechanical properties, but processibility is decreased, and especially extruding becomes more difficult. Preferably the melt spun longitudinally drawn tape has a tenacity of at least 13 cN/dtex, preferably at least 16 cN/dtex, even more preferably at least 20 cN/dtex.

According to a further embodiment, the HMwPE or UHMwPE tape is provided by feeding a polymeric powder comprising HMwPE and/or UHMwPE between a combination of endless belts, compression-moulding the polymeric powder at a temperature below the melting point thereof and rolling the resultant compression-moulded polymer followed by drawing. The process of making a tape in this way is known from e.g. U.S. Pat. Nos. 4,879,076 and 5,091,133, which are incorporated herein by reference. The draw ratio is preferably at least 1.5, more preferably at least 5, even more preferably at least 10. If desired, prior to feeding and compression-moulding the polymer powder, the polymer powder may be mixed with a suitable liquid organic compound having a boiling point higher than the melting point of said polymer. Compression moulding may also be carried out by temporarily retaining the polymer powder between the endless belts while conveying them. This may for instance be done by providing pressing platens and/or rollers in connection with the endless belts. The tape made in this way is reshaped into a fiber by the process of the present invention. This process provides a completely novel process for making a fiber, which does not involve a spinning process such as a gel-spinning process or a melt-spinning process. Thus, a process for making a fiber is provided which is free from any restrictions that a spinning process may have.

The tape obtained in this way may be slit in the longitudinal direction. It is noted that, although it is possible to make a fiber with an aspect ratio of the cross section of around 1 by slitting the tape, the slitting may damage the tape and reduce the strength of the tape. Such a fiber made by just slitting does not have the required strength for many applications. In contrast, according to one embodiment of the present invention, the tape is slit in the longitudinal direction and then is subjected to the step of twisting or folding the tape longitudinally, after which the fusing step is carried out. The damage caused by the slitting was found to substantially disappear after the fusing step, resulting in very good strength values. This embodiment allows that a desired thickness of the final fiber is obtained as well as the high strength.

In one embodiment, the step involving fusing is performed while the twisted or folded tape is drawn with a draw ratio of 1.01-5.0, preferably 1.1-3.0, more preferably 1.2-2.5, even more preferably 1.4-2.0, even more preferably 1.5-1.8. Drawing while subjecting it to the melting point range of the tape results in the fiber having improved mechanical properties, such as tenacity.

The present invention also relates to the fiber obtainable by the process according to the present invention. Preferably, the fiber has a substantially circular cross section. However, there is no limitation in the possible cross section of the fiber. The cross section may be e.g. rectangular, square, elliptical, U-shaped.

The fiber made from a gel-spun monofilament UHMwPE tape was found to have a very high tenacity. Preferably, the fiber has a tenacity of at least 20 cN/dtex, preferably at least 25 cN/dtex, even more preferably at least 30 cN/dtex, most preferably at least 35 cN/dtex.

Furthermore, the fiber made from a gel-spun monofilament UHMwPE tape has a very high modulus. Preferably, the fiber has a modulus of at least 600 cN/dtex, more preferably at least 900 cN/dtex, even more preferably at least 1300 cN/dtex. The high modulus is especially advantageous in a fishing line and other applications where even small movement of one end must be transferred to the other end immediately and without substantial reduction.

In one embodiment, the fiber has a substantially circular cross section and a diameter of at least 100 µm, preferably at least 120 µm, more preferably at least 150 µm. The fiber having such a large diameter may be directly used for various applications. In fact, the process according to the present invention hardly has any upper limit for the thickness of the fibers. Values up to centimeters are possible. The drawing forces increase for thick fibers, but technology means to solve this problem are standard available in industry. However, for most practical applications such very thick fibers are not needed. Therefore, the fiber preferably has a diameter of at most 3000 µm, more preferably at most 1500 µm, more preferably at most 500 µm. The diameter of the fiber is limited essentially only by the width and the thickness of the tape, and the number of tapes applied.

In one embodiment, the fiber has a surface roughness Ra of at least 0.5 µm, preferably at least 1 µm. This may be achieved by the adjusting the way the tape is twisted or folded, as well as the conditions such as temperature and pressure in which the fusing is done. A high surface roughness may be advantageous in applications where the knottability is of importance. An exemplary method of measuring the surface roughness is described below.

The surface roughness Ra is determined with an optical profilometer (Veeco NT1100). A yarn specimen is gold-coated before the measurement to prevent unwanted internal reflections. The yarn specimen is scanned using the VSI-mode (vertical scanning interferometry). After scanning, the profile is corrected by cylinder and tilt correction to adjust to the cylindrical shape of the filament using an operating-software of the optical profilometer. The surface roughness is calculated from the scanned data by the operating-software.

The fiber of the present invention has various applications, including a fishing line. The high tenacity, modulus and elongation at break combine to give an especially advantageous fishing line. Furthermore, the fishing line of the present invention has advantageous over a fishing line made from braided yarns in that the fishing line of the present invention does not entrap water and do not present an outer surface that is vulnerable to snags and entanglement. Braided lines can also have the tendency to fray at the end of the line. When tied into a knot, this "tag end" frays to create a fuzzy protrusion that can adversely affect the appearance and acceptability of a lure when fishing. In addition, braided lines made from gel spun polyethylenes cannot be cut cleanly with a compression type of line clipper that is commonly in use among anglers. The braid must be cut with a scissors or other type of shearing device to ensure that all filaments in the braid are severed evenly. Another application includes a kite line comprising the fiber according to the present invention. It has less aerodynamic drag than a kite line made by braids of thinner fibers. The high mechanical properties of the fiber are advantageous in various applications, such as actuator cables used in mechanical equipments. Actuator cables must have a high modulus, since even a very small strain may affect the precise control of the actuators.

The invention will be explained more fully below with reference to the following example.

Methods:

IV: the Intrinsic Viscosity was determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration.

dtex: fibers' linear density (dtex, g/10 km) was measured by weighing a piece of fiber of 10 m length. The measured weight in mg is the dtex.

Tensile properties: tensile tests were carried out on an Instron Z010 tensile tester equipped with a 1 kN load cell and Instron parabolic fiber grips, in accordance with ASTM D885M, using a nominal gauge length of the fibre of 500 mm. Tensile strength was determined from the force at break and the linear density measured on each individual sample. Tensile modulus was determined as the chord modulus between 0.3 and 1.0% strain. Elongation at break and strain were determined by using a gauge length of 100 mm with a tension of 0.08 N at zero strain. The gauge length incorporated the full fiber length on the parabolic grip sections until the beginning of the flat pneumatical grip sections. Strain rate during tensile testing was 50 mm/min.

1. Making of a Fiber from a Gel-Spun UHMwPE Monofilament Tape 1.1 Making of a Gel-Spun UHMwPE Monofilament Tape

EXAMPLE 1

A UHMwPE monofilament tape was made via a gel spinning process. A solution of 8 wt % of UHMwPE of IV 20 dl/g in decalin was spun at about 160° C. through a spin plate having one spin hole into a solution monofilament tape. The solution monofilament tape was issued from a slot of 72 mm by 0.8 mm to an air-gap of 5 mm and entered a water bath. The solution monofilament tape was cooled in the water bath kept at about 30° C. to obtain a gel tape, and taken-up at such rate that a draw ratio of 1.8 was applied in the air-gap. Spin velocity was kept constant at 2.8 m/min. The gel tape was subsequently further drawn with a draw ratio of 20 at an average temperature of 125° C. to obtain a partially drawn tape. The partially drawn tape was wound into a bobbin using a winder which has a slot with a smaller width than the width of partially drawn tape. This caused longitudinal folding of the partially drawn tape. Spin finish was not applied. This folded partially drawn tape was subsequently drawn with a draw ratio of 3.5 at an average temperature of 151° C., to obtain a fully drawn tape.

The flat section and cross section of the tape were observed by SEM. It was observed that the folded sections of the tape have been fused during the final drawing. The thickness of the tape varied depending on the number of layers of the tape on top of each other, ranging from about 10 to 40 μm. The width of the tape was about 0.85 mm.

The tensile properties of the tape were measured according to the methods described hereinabove and the results are presented in Table 1.

EXAMPLE 2-5

Experiment was carried out analogously to example 1, but the partially drawn tape was not further drawn for example 2, and the draw ratio of the second drawing step to obtain a fully drawn tape was 2.5, 3.0 and 4.0, respectively for examples 3, 4 and 5. The tensile properties of the yarn were measured according to the methods described hereinabove and the results are presented in Table 1.

TABLE 1

| | Draw ratio in second drawing step | Titer dtex | Tenacity cN/dtex | E-modulus cN/dtex | Elongation at break % |
|---|---|---|---|---|---|
| Ex. 1 | 3 | 334 | 30.4 | 1174.1 | 2.98 |
| Ex. 2 | 1 (PDT*) | 996 | 18.2 | 372.1 | 5.81 |
| Ex. 3 | 2.5 | 411 | 28.3 | 1069.5 | 3.18 |
| Ex. 4 | 3.5 | 292 | 30.3 | 1440.2 | 2.56 |
| Ex. 5 | 4 | 252 | 32.7 | 1522.3 | 2.66 |

*PDT: Partially drawn tape; a tape obtained without the second drawing step

EXAMPLE 6

Experiment was carried out analogously to example 1, but the partially drawn tape was wound using a winder without a slot. Thus, a tape was obtained without longitudinal folding.

The width and the thickness of the tape were determined by SEM to be 4000 μm and 10 μm, respectively. This high ratio between the width and the thickness is surprising, since it is much higher than that of the spin hole of the spin plate.

1.2. Making of a Fiber From the Gel-Spun Tape

EXAMPLES 7-10

A monofilament fiber with a generally circular cross section was made by reshaping the tape made according to example 1. The tape was twisted with 300 t/m and was stretched again at a temperature of 151° C. No fusion aid like paraffin oil was applied, since it was found that paraffin oil leads to lower mechanical properties. During the stretching, the tension force was applied as indicated in the Table 2 for each example to obtain the draw ratio of 1.5, 1.6, 1.7 and 1.8, respectively for examples 7-10. The twisted tape resulted in a monofilament fiber. The tensile properties of the tape were measured according to the methods described hereinabove and the results are presented in Table 2. Tenacity is very high, and in one example tenacity as high as 38.9 cN/dtex was obtained. This tenacity is higher than known fused yarn obtained from multiple filaments. The reason for this high tenacity could be, without being limited thereto, that the yarn from fused multiple filaments have more interfaces made by fusing than the fiber according to the present invention.

TABLE 2

|  | Draw ratio | Titer dtex | Tenacity cN/dtex | E-modulus cN/dtex | Elongation at break % | Stretch tension cN |
|---|---|---|---|---|---|---|
| Ex. 7 | 1.5 | 203 | 34.4 | 1526.9 | 2.71 | 542 |
| Ex. 8 | 1.6 | 185 | 36.7 | 1657.3 | 2.66 | 564 |
| Ex. 9 | 1.7 | 173 | 38.9 | 1755.2 | 2.7 | 623 |
| Ex. 10 | 1.8 | 164 | 37.4 | 1743.7 | 2.59 | 644 |

2. Making of a Fiber From a UHMwPE Tape Made by Compression-Moulding

A tape prepared by compression-moulding and rolling a bed of fine powder of UHMWPE was subjected to the process of making the fiber according to the present invention. The original tape had a width of 110 mm and a thickness of 45 μm. The tenacity of the tape was measured to be 16 cN/dTex. The tape was first slit to have a width of 3 mm. The obtained tape was twisted with 300 t/m (turns per meter) and 450 t/m. The tensile properties of the twisted tapes as well as the non-twisted tape were measured according to the methods described hereinabove and the results are presented in Table 3.

TABLE 3

|  | Titer dTex | Tenacity cN/dTex | E-modulus cN/dTex |
|---|---|---|---|
| non-twisted | 1108 | 11.2 | 1120.7 |
| 300 t/m twisted | 1375 | 5.5 | 635 |
| 450 t/m twisted | 1243 | 3.1 | 522 |

By comparing the tenacity of the original tape and the slit tape (indicated as non-twisted in Table 3), it can be seen that the tenacity has decreased substantially by the slitting step. It can also be seen that the tenacity and the E-modulus have significantly decreased by the twisting.

EXAMPLES 11-14

The tape twisted with 300 t/m was drawn at 150.6° C. at a draw ratio of 1.1, 1.2, 1.3 and 1.4, respectively for examples 11-14. The draw ratio is calculated from the ratio between the speeds of the driven rolls. No fusion aid like paraffin oil was applied. The twisted tape resulted in a monofilament fiber. The tensile properties of the fiber were measured according to the methods described hereinabove and the results are presented in Table 4.

TABLE 4

|  | Draw ratio | Titer dTex | Tenacity cN/dTex | E-modulus cN/dTex |
|---|---|---|---|---|
| Ex. 11 | 1.1 | 1100 | 16.3 | 940.3 |
| Ex. 12 | 1.2 | 1057 | 17.8 | 1041.3 |
| Ex. 13 | 1.3 | 1000 | 18.7 | 1136.1 |
| Ex. 14 | 1.4 | 967 | 16.9 | 1150.7 |

The tenacity and the E-modulus have increased dramatically compared to the twisted non-drawn tape. It is observed that the tenacity has increased to a level before the slitting of the tape, or even higher.

EXAMPLES 15-25

The tape twisted with 450 t/m was drawn at the respective temperature and the draw ratio as shown in Table 5. No fusion aid like paraffin oil was applied. The twisted tape resulted in a monofilament fiber. The tensile properties of the fiber were measured according to the methods described hereinabove and the results are presented in Table 5.

TABLE 5

|  | temperature ° C. | draw ratio | Titer dTex | Tenacity cN/dTex | E-modulus cN/dTex |
|---|---|---|---|---|---|
| Ex. 15 | 150.6 | 1.5 | 1232 | 11.5 | 591.7 |
| Ex. 16 | 150.6 | 2.0 | 1034 | 15.6 | 781.4 |
| Ex. 17 | 150.6 | 2.5 | 1144 | 13.5 | 687.3 |
| Ex. 18 | 150.6 | 3.0 | 1091 | 13.6 | 719.7 |
| Ex. 19 | 151.6 | 1.5 | 1096 | 12.5 | 668.7 |
| Ex. 20 | 151.6 | 2.0 | 978 | 16.3 | 881.8 |
| Ex. 21 | 152.6 | 1.5 | 1210 | 13.4 | 677.5 |
| Ex. 22 | 152.6 | 2.0 | 1123 | 13.4 | 747.8 |
| Ex. 23 | 152.6 | 2.5 | 943 | 14.7 | 886.7 |
| Ex. 24 | 153.6 | 1.5 | 1046 | 15.4 | 838.4 |
| Ex. 25 | 153.6 | 2.0 | 861 | 17.6 | 1005.3 |

The invention claimed is:

1. A process for making a polyolefin fiber, comprising the steps of:
    a) providing at least one polyolefin tape;
    b) twisting or folding the at least one polyolefin tape longitudinally to obtain a precursor fiber, and
    c) exposing the precursor fiber under tension to a temperature within a melting point range of the polyolefin for a time sufficient to at least partly fuse two or more parts of the precursor fiber.

2. The process according to claim 1, wherein the polyolefin fiber is made from one polyolefin tape.

3. The process according to claim 1, wherein the polyolefin tape is a high molecular weight polyethylene (HMwPE) tape or an ultrahigh molecular weight polyethylene (UHMwPE) tape.

4. The process according to claim 3, wherein the step a) comprises the steps of:
    a1) providing a fluid composition comprising HMwPE and/or UHMwPE;
    a2) spinning a fluid tape from the fluid composition from a spinhole having an anisotropic shape;
    a3) cooling the fluid tape to obtain a solidified tape; and
    a4) drawing the solidified tape in at least one direction in at least one drawing step.

5. The process according to claim 4, wherein the drawing step is performed only in a longitudinal direction at a draw ratio of at least 1.5.

6. The process according to claim 4, wherein the drawing step is performed in at least two directions, at an area draw ratio of at least 10.

7. The process according to claim 4, wherein the fluid composition is a solution of UHMwPE in a solvent and the process comprises the step of at least partly removing the solvent.

8. The process according to claim 4, wherein the fluid composition is a melt of HMwPE and/or UHMwPE having a molecular weight of up to 800,000.

9. The process according to claim 3, wherein the step a) comprises the steps of feeding a polymeric powder comprising HMwPE and/or UHMwPE between a combination of endless belts, compression-moulding the polymeric powder at a temperature below the melting point thereof and rolling the resultant compression-moulded polymer followed by drawing.

10. The process according to claim 1, wherein the step c) is performed while the twisted or folded tape is drawn with a draw ratio of 1.01-5.0.

11. The process according to claim 4, wherein the drawing step is performed only in a longitudinal direction at a draw ratio of at least 5.

12. The process according to claim 4, wherein the drawing step is performed only in a longitudinal direction at a draw ratio of at least 10.

13. The process according to claim 1, wherein the step c) is performed while the twisted or folded tape is drawn with a draw ratio of 1.1-3.0.

14. The process according to claim 1, wherein the step c) is performed while the twisted or folded tape is drawn with a draw ratio of 1.2-2.5.

15. A process according to claim 1, wherein the step c) is performed while the twisted or folded tape is drawn with a draw ratio of 1.4-2.0.

16. A process according to claim 1, wherein the step c) is performed while the twisted or folded tape is drawn with a draw ratio of 1.5-1.8.

17. A fiber obtained by the process according to claim 1.

18. The fiber according to claim 17, wherein the fiber has a substantially circular cross section.

19. The fiber according to claim 17, wherein the fiber has a tenacity of at least 30 cN/dtex.

20. The fiber according to claim 19, wherein the fiber has a tenacity of at least 35 cN/dtex.

21. The fiber according to claim 17, wherein the fiber has a substantially circular cross section and a diameter of at least 100 μm.

22. The fiber according to claim 21, wherein the fiber has a diameter of at least 120 μm.

23. The fiber according to claim 21, wherein the fiber has a diameter of at least 150 μm.

24. The fiber according to claim 17, wherein the fiber has a surface roughness Ra of at least 0.5 μm.

25. The fiber according to claim 17, wherein the fiber has a surface roughness Ra of at least 1 μm.

26. A fishing line comprising the fiber according to claim 17.

* * * * *